(12) United States Patent
Chen (10) Patent No.: US 11,496,919 B2
(45) Date of Patent: Nov. 8, 2022

(54) MEASUREMENT REPORTING METHOD, MEASUREMENT CONFIGURATION METHOD, TERMINAL, AND NETWORK SIDE DEVICE

(71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 85 days.

(21) Appl. No.: 17/100,526

(22) Filed: Nov. 20, 2020

(65) Prior Publication Data

US 2021/0099903 A1    Apr. 1, 2021

Related U.S. Application Data

(63) Continuation of application No. PCT/CN2019/087788, filed on May 21, 2019.

(30) Foreign Application Priority Data

May 22, 2018 (CN) .......................... 201810496793.9

(51) Int. Cl.
    *H04W 24/10*      (2009.01)
    *H04L 5/00*       (2006.01)
    *H04W 56/00*      (2009.01)

(52) U.S. Cl.
    CPC ........... *H04W 24/10* (2013.01); *H04L 5/0051* (2013.01); *H04L 5/0092* (2013.01); *H04W 56/001* (2013.01)

(58) Field of Classification Search
    CPC .. H04W 24/10; H04W 56/001; H04L 5/0051; H04L 5/0092
    See application file for complete search history.

(56) References Cited

U.S. PATENT DOCUMENTS

| | | |
|---|---|---|
| 2012/0020230 A1 | 1/2012 | Chen et al. |
| 2017/0012684 A1* | 1/2017 | Zhang .................. H04B 7/0456 |
| 2017/0310384 A1 | 10/2017 | Park et al. |
| 2019/0150020 A1 | 5/2019 | Takahashi et al. |
| 2019/0230547 A1 | 7/2019 | Li et al. |
| 2020/0037260 A1* | 1/2020 | Fu ........................ H04L 27/2646 |
| 2020/0280357 A1* | 9/2020 | Bae ........................ H04W 72/04 |
| 2020/0313832 A1* | 10/2020 | Kim ..................... H04W 72/042 |

(Continued)

FOREIGN PATENT DOCUMENTS

| | | |
|---|---|---|
| CA | 3 023 353 A1 | 11/2017 |
| CN | 102255685 A | 11/2011 |

(Continued)

OTHER PUBLICATIONS

CN Office Action in Application No. 201810496793.9 dated Apr. 15, 2020.

(Continued)

*Primary Examiner* — Deepa Belur
(74) *Attorney, Agent, or Firm* — Maschoff Brennan (57) ABSTRACT

Provided is a measurement reporting method, measurement configuration method, terminal and network side device, wherein the measurement reporting method comprises: the terminal reports the measurement result of the reference signal of the first predetermined bandwidth portion BWP.

18 Claims, 4 Drawing Sheets

(56) References Cited

U.S. PATENT DOCUMENTS

| | | | |
|---|---|---|---|
| 2021/0127399 A1* | 4/2021 | Kou | H04W 72/0453 |
| 2021/0127419 A1* | 4/2021 | Zhang | H04W 74/0808 |
| 2022/0046646 A1* | 2/2022 | Xu | H04W 76/00 |
| 2022/0240117 A1* | 7/2022 | Chen | H04L 27/0006 |

FOREIGN PATENT DOCUMENTS

| | | | | |
|---|---|---|---|---|
| CN | 102291731 A | 12/2011 | | |
| CN | 103825670 A | 5/2014 | | |
| CN | 105991244 A | 10/2016 | | |
| CN | 107835516 A | 3/2018 | | |
| CN | 107889141 A | 4/2018 | | |
| EP | 3 515 107 A1 | 7/2019 | | |
| WO | 2017195494 A1 | 11/2017 | | |
| WO | WO-2017195494 A1 * | 11/2017 | | H04B 17/309 |
| WO | WO-2019169588 A1 * | 9/2019 | | H04L 5/00 |

OTHER PUBLICATIONS

CN Office Action in Application No. 201810496793.9 dated Jan. 1, 2021.

"Remaining issues for CSI framework" Huawei, HiSilicon, 3GPP TSG RAN WG1 Meeting #91, R1-1719426, Nov. 27, 2017.

Written Opinion and International Search Report in Application No. PCT/CN2019/087788 dated Dec. 3, 2020.

"3rd Generation Partnership Project; Technical Specification Group Radio Access Network; NR; Physical layer procedures for data (Release 15)" 3GPP TS 38.214 V15.1.0 (Mar. 2018).

EP Search Report in Application No. 19808190.3 dated Jul. 8, 2021.

"Remaining Details on Bandwidth Part Operation in NR" 3GPP TSG RAN WG1 Meeting 91, MediaTek Inc., R1-1719551, Nov. 27, 2017.

"RRM Measurement for Bandwidth Part Operation" 3GPP TSG-RAN WG2 Meeting #99, MediaTek Inc., R2-1708001, Aug. 21, 2017.

"Impact of BWP on RRM measurement" 3GPP TSG-RAN WG2 Meeting #99bis, LG Electronics Inc., R2-1710808, Oct. 9, 2017.

"RRM Measurement Considering Bandwidth Part Operation" 3GPP TSG-RAN WG2 #99-bis, MediaTek Inc., R2-1710882, Oct. 9, 2017.

"RRM measurement to support bandwidth parts in NR" 3GPP TSG-RAN WG2 NR#99bis Meeting, Samsung, R2-1711190, Oct. 9, 2017.

"BWP Impact on RRM Measurements for Wideband CC" 3GPP TSG RAN WG2 Meeting #100, Sony, R2-1712990, Nov. 27, 2017.

"Measurement Events to Support BWPs" 3GPP TSG-RAN WG2 Ad Hoc 1801, InterDigital Inc., R2-1801114, Jan. 22, 2018.

"Discussion on working scope of NR WID" 3GPP TSG RAN meeting #77, ZTE, Sanechips, RP-171720, Sep. 11, 2017.

* cited by examiner

FIG. 1

Report a measurement result of a reference signal of a first pre-defined BWP — 21

FIG. 2

Send configuration information to a terminal, where the configuration information is used to determine a to-be-reported first pre-defined BWP and a measurement result of a reference signal of the to-be-reported first pre-defined BWP, and/or a to-be-measured second pre-defined BWP and a measurement result of a reference signal of the to-be-measured second pre-defined BWP, and the first pre-defined BWP is at least some BWPs of the second pre-defined BWP — 31

MEASUREMENT REPORTING METHOD, MEASUREMENT CONFIGURATION METHOD, TERMINAL, AND NETWORK SIDE DEVICE

CROSS REFERENCE TO RELATED APPLICATIONS

This application is a continuation application of PCT Application No. PCT/CN2019/087788 filed on May 21, 2019, which claims priority to Chinese Patent Application No. 201810496793.9 filed in China on May 22, 2018, which is incorporated herein by reference in its entirety.

TECHNICAL FIELD

Embodiments of the present disclosure relate to the field of wireless communications technologies, and in particular, to a measurement reporting method, a measurement configuration method, a terminal, and a network side device.

BACKGROUND

A channel state information reference signal (Channel State Information Reference Signal, CSI-RS for short) is an existing concept in Long Term Evolution (Long Term Evolution, LTE for short). Because a concept of beam (beam) is introduced in new radio (New radio, NR for short), a CSI-RS may be used to indicate a beam because of a flexible configuration thereof. A synchronization signal block (synchronization signal block, SSB for short) is a new synchronous signal introduced in NR, and is periodically sent, where a period thereof may be configured. The SSB may also indicate a beam. Generally, the SSB may indicate a relatively wide beam, while the CSI-RS may indicate a relatively narrow beam. However, both can indicate a wide/narrow beam through a reasonable configuration.

A 5G NR system supports a maximum system bandwidth of 400 MHz that is much higher than a maximum system bandwidth of 20 MHz of LTE, to support a larger system and a higher user throughput. However, supporting such a higher system bandwidth is a great challenge to implementation of a terminal (User Equipment, UE for short), and is not conducive to implementation of a terminal at a low cost. Therefore, the 5G NR system also supports dynamic and flexible bandwidth allocation, and a system bandwidth is divided into a plurality of bandwidth parts (Bandwidth Part, BWP for short) to support access of a terminal user in a narrowband or a terminal user in an energy-saving mode.

One or more BWPs may be configured for a terminal on a network side, and a BWP that may be used by the terminal to work may be switched by activating or deactivating a BWP.

In LTE, existing measurement reporting is based on a measurement configuration, and a measurement result of a serving cell, including reference signal received power (Reference Signal Receiving Power, RSRP for short) and/or reference signal received quality (Reference Signal Receiving Quality, RSRQ for short) is reported.

In an NR system, because one or more BWPs may be configured for a terminal on a network side, currently, there is no final conclusion on how the terminal determines BWPs of which measurement results are reported.

SUMMARY

Embodiments of the present disclosure provide a measurement reporting method, a measurement configuration method, a terminal, and a network side device, to resolve a problem that when one or more BWPs are configured for a terminal on a network side, the terminal cannot determine BWPs of which measurement results are reported.

To resolve the foregoing technical problem, the present disclosure is implemented as follows:

According to a first aspect, an embodiment of the present disclosure provides a measurement reporting method, applied to a terminal. The measurement reporting method includes: reporting a measurement result of a reference signal of a first pre-defined BWP.

According to a second aspect, an embodiment of the present disclosure provides a measurement configuration method, applied to a network side device. The measurement configuration method includes: sending configuration information to a terminal, where the configuration information is used to determine a to-be-reported first pre-defined BWP and a measurement result of a reference signal of the to-be-reported first pre-defined BWP, and/or a to-be-measured second pre-defined BWP and a measurement result of a reference signal of the to-be-measured second pre-defined BWP, and the first pre-defined BWP is at least one BWP of the second pre-defined BWP.

According to a third aspect, an embodiment of the present disclosure provides a terminal, including: a reporting module, configured to report a measurement result of a reference signal of a first pre-defined BWP.

According to a fourth aspect, an embodiment of the present disclosure provides a network side device, including: a configuration module, configured to send configuration information to a terminal, where the configuration information is used to determine a to-be-reported first pre-defined BWP and a measurement result of a reference signal of the to-be-reported first pre-defined BWP, and/or a to-be-measured second pre-defined BWP and a measurement result of a reference signal of the to-be-measured second pre-defined BWP, and the first pre-defined BWP is at least one BWP of the second pre-defined BWP.

According to a fifth aspect, an embodiment of the present disclosure provides a terminal, including: a processor, a memory, and a program stored in the memory and executable on the processor, where when the program is executed by the processor, the step of the foregoing measurement reporting method is performed.

According to a sixth aspect, an embodiment of the present disclosure provides a network side device, including: a processor, a memory, and a program stored in the memory and executable on the processor, where when the program is executed by the processor, the step of the foregoing measurement configuration method is performed.

According to a seventh aspect, an embodiment of the present disclosure provides a computer readable storage medium, where the computer readable storage medium stores a program, and when the program is executed by a processor, the step of the foregoing measurement reporting method is performed.

According to an eighth aspect, an embodiment of the present disclosure provides a computer readable storage medium, where the computer readable storage medium stores a program, and when the program is executed by a processor, the step of the foregoing measurement configuration method is performed In the embodiments of the present disclosure, when one or more BWPs are configured for the terminal on the network side, the terminal reports the measurement result of the reference signal of the first pre-defined BWP of the one or more BWPs, and a manner of measurement reporting is defined for the terminal, thereby improving system performance.

BRIEF DESCRIPTION OF DRAWINGS

A person of ordinary skill in the art can clearly learn of various other advantages and benefits by reading detailed description of the following optional implementations. Accompanying drawings are merely used for showing the optional implementations, and are not considered as limitation on the present disclosure. In all the accompanying drawings, a same reference symbol is used to indicate a same part. In the accompanying drawings.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The term "include" and any variant thereof in the specification and claims of the present disclosure are intended to cover non-exclusive inclusion, for example, processes, methods, systems, products, or devices that include a series of steps or units are not necessarily limited to those clearly listed steps or units, but may include other steps or units not clearly listed or inherent to these processes, methods, products, or devices. In addition, "and/or" used in the specification and claims means at least one of connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design solution described as "exemplary" or "example" in the embodiments of the present disclosure shall not be explained as being more preferred or having more advantages than another embodiment or design solution. Exactly, use of the word such as "exemplary" or "example" is intended to present a related concept in a specific manner.

The following describes the embodiments of the present disclosure with reference to the accompanying drawings. A measurement reporting method, a measurement configuration method, a terminal, and a network side device provided in the embodiments of the present disclosure may be applied to a wireless communications system. The wireless communications system may be a 5G system, an evolved long term evolution (Evolved Long Term Evolution, eLTE for short) system, or a subsequent evolved communications system.

Figure 1:
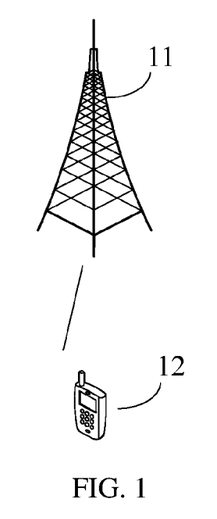
FIG. 1 is a schematic architectural diagram of a wireless communications system according to an embodiment of the present disclosure.

Referring to FIG. 1, FIG. 1 is a schematic architectural diagram of a wireless communications system according to an embodiment of the present disclosure. As shown in FIG. 1, the wireless communications system may include: a network device 11 and a terminal. For example, the terminal is denoted as UE 12, and the UE 12 may be connected to the network device 11. In an actual application, a connection between the devices may be a wireless connection. For ease of visually indicating a connection relationship between the devices, a solid line is used for illustration in FIG. 1.

It should be noted that the communications system may include a plurality of UEs, and the network device may communicate with the plurality of UEs (transmit signaling or data).

The network device 11 provided in this embodiment of the present disclosure may be a base station. The base station may be a common base station, or may be an evolved NodeB (evolved NodeB, eNB for short), or may be a device such as a network side device in a 5G system (for example, a next-generation NodeB (next-generation NodeB, gNB for short)) or a transmission and reception point (transmission and reception point, TRP for short) or a cell, or may be a network side device in a subsequent evolved communications system. The foregoing terms used constitute no limitation.

The UE 12 provided in this embodiment of the present disclosure may be a mobile phone, a tablet computer, a notebook computer, an ultra-mobile personal computer (Ultra-Mobile Personal Computer, UMPC for short), a netbook, a personal digital assistant (Personal Digital Assistant, PDA for short), or the like. A person skilled in the art may understand that the foregoing terms used constitute no limitation.

Figure 2:
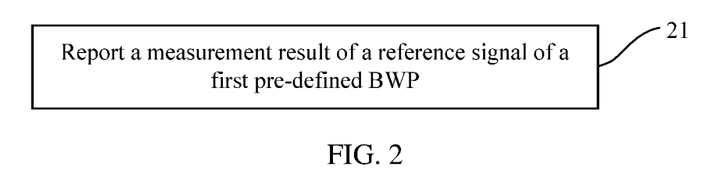
FIG. 2 is a schematic flowchart of a measurement reporting method according to an embodiment of the present disclosure.

Referring to FIG. 2, FIG. 2 is a measurement reporting method according to an embodiment of the present disclosure, applied to a terminal, and including:

Step 21: Report a measurement result of a reference signal of a first pre-defined (pre-defined) BWP.

In this embodiment of the present disclosure, when one or more BWPs are configured on a network side for the terminal, the terminal reports the measurement result of the reference signal of the first pre-defined BWP of the one or more BWPs, and a manner of measurement reporting is defined for the terminal, thereby improving system performance.

In this embodiment of the present disclosure, the reference signal may include at least one of the following: a CSI-RS, a demodulation reference signal (Demodulation Reference Signal, DMRS for short), and an SSB.

There may be one or more first pre-defined BWPs. When there are a plurality of first pre-defined BWPs, a reference signal of each reported first pre-defined BWP may be the same or different. For example, two first pre-defined BWPs are included, where a reference signal of one reported first pre-defined BWP is a CSI-RS, and a reference signal of the other first pre-defined BWP is an SSB.

In this embodiment of the present disclosure, when a plurality of BWPs are configured on the network side for the terminal, the terminal may measure reference signals of all of the plurality of BWPs, or may measure reference signals of some of the plurality of BWPs. This is not limited in the present disclosure.

In this embodiment of the present disclosure, when the terminal measures a plurality of BWPs, some of the plurality of measured BWPs may be used as the first pre-defined BWP for reporting, or measurement results of reference signals of all the measured BWPs may be reported.

To be specific, before step 21, that is, before the step of reporting a measurement result of a reference signal of a first pre-defined BWP, the method further includes:

Step 201: Measure a reference signal of a second pre-defined BWP, to obtain a measurement result.

The second pre-defined BWP may be all the BWPs configured on the network side for the terminal, or may be some of all the BWPs configured on the network side for the terminal.

Step 202: Select at least one BWP from the second pre-defined BWP as the first pre-defined BWP.

That is, the first pre-defined BWP may be some BWPs of the second pre-defined BWP, or may be all BWPs of the second pre-defined BWP.

In this embodiment of the present disclosure, information such as BWPs of which reference signals need to be measured by the terminal, and/or BWPs of which measurement results of reference signals need to be reported by the terminal may be configured on the network side, or may be stipulated in a protocol.

To be specific, before step 201, that is, before the step of measuring a reference signal of a second pre-defined BWP, the method may further include:

determining the to-be-measured second pre-defined BWP and the reference signal of the to-be-measured second pre-defined BWP based on configuration information sent by a network side device, or based on protocol stipulation; and/or determining the to-be-reported first pre-defined BWP and the measurement result of the reference signal of the to-be-reported first pre-defined BWP based on configuration information sent by a network side device, or based on protocol stipulation.

In this embodiment of the present disclosure, the network side device may configure the configuration information for the terminal through a measurement object (measurement Object, MO for short) or a measurement configuration (measurement configuration).

In this embodiment of the present disclosure, the configuration information sent by the network side device may be measurement configuration information, or may be measurement reporting configuration information.

In this embodiment of the present disclosure, the configuration information sent by the network side device may be configuration information of a serving cell of the terminal, and/or configuration information of a neighboring cell.

In this embodiment of the present disclosure, the measurement result of the reference signal of the second pre-defined BWP, and/or the measurement result of the reference signal of the first pre-defined BWP includes at least one of the following plurality of to-be-selected measurement results:

(1) a measurement result of a reference signal of any currently activated BWP.

In this embodiment of the present disclosure, there may be one or more currently activated BWPs.

(2) measurement results of reference signals of all currently activated BWPs.

(3) a result obtained after combining measurement results of reference signals of all currently activated BWPs.

In (1) to (3), measurement is performed on an activated BWP. This can prevent the terminal from frequently switching a band.

(4) a measurement result of a reference signal of any BWP including a CD-SSB.

In this embodiment of the present disclosure, a master information block (master information block, MIB) and a system information block type 1 (System Information Block Type 1, SIB1) of system information are sent on the network side by using resources indicated by some SSBs. An SSB carrying MIB and SIB1 resources is referred to as a cell defining SSB (cell defining SSB, CD-SSB for short). The terminal in an idle state receives system information (SI) and paging (Paging) on a CD-SSB with a desirable channel condition. The terminal in a connected state performs radio link monitoring (Radio Link Monitor, RLM for short), beam failure detection (Beam Failure Detection, BFD for short), and the like on a CD-SSB.

(5) a measurement result of a reference signal of an activated BWP including a CD-SSB.

(6) measurement results of reference signals of all BWPs including a CD-SSB.

(7) a result obtained after combining measurement results of reference signals of all BWPs including a CD-SSB.

In (4) to (7), measurement is performed on a BWP including a CD-SSB. This can prevent the terminal from performing unnecessary switching in some conditions, for example, channel quality of the CD-SSB is undesirable.

(8) a measurement result of a reference signal of an activated third BWP, where the third BWP is a BWP including an SSB indicated as a reference signal of a serving cell.

In this embodiment of the present disclosure, configuration information of the reference signal may include a parameter "a serving cell or not". When "a serving cell or not" indicates "yes", it indicates that the reference signal is a reference signal of a serving cell.

(9) a measurement result of a reference signal of any third BWP.

(10) measurement results of reference signals of all third BWPs.

(11) a result obtained after combining measurement results of reference signals of all third BWPs.

In (4) to (10), optionally, the reference signal of the BWP includes an SSB.

(12) a measurement result of a reference signal of an activated fourth BWP, where the fourth BWP is a BWP including a CSI-RS indicated as a reference signal of a serving cell.

(13) a measurement result of a reference signal of any fourth BWP.

(14) measurement results of reference signals of all fourth BWPs.

(15) a result obtained after combining measurement results of reference signals of all fourth BWPs.

In (12) to (15), optionally, the reference signal of the BWP includes a CSI-RS.

(16) measurement results of reference signals of all configured BWPs.

(17) a result obtained after combining measurement results of reference signals of all configured BWPs.

(18) a measurement result of a reference signal corresponding to a frequency that is configured on a network side and that is of a serving cell.

(19) a measurement result of a reference signal of a BWP on which a serving cell common configuration (Serving CellConfig Common) signaling message is located.

(20) a measurement result of a reference signal of a BWP meeting at least two of the following conditions, where a first condition is being activated currently, a second condition is including a CD-SSB, a third condition is including a CD-SSB and being activated currently, a fourth condition is including an SSB indicated as a reference signal of a serving cell and being activated currently, a fifth condition is including an SSB indicated as a reference signal of a serving cell, a sixth condition is including a CSI-RS indicated as a reference signal of a serving cell, a seventh condition is including a CSI-RS indicated as a reference signal of a serving cell and being activated currently, and an eighth condition is being used to transmit a serving cell common configuration signaling message.

For example, the first pre-defined BWP is a BWP meeting the second condition and the eighth condition, that is, the first pre-defined BWP is a BWP that is "used to transmit a serving cell common configuration signaling message" and that "includes a CD-SSB".

In the foregoing embodiment, the result obtained after combining the measurement results may be: a linear average of all the measurement results (that is, a sum of all the measurement results divided by a quantity of the measurement results), or a weighted average of all the measurement results.

In this embodiment of the present disclosure, because there are a plurality of to-be-selected measurement results, the terminal may determine a measurement result of a reference signal of a preferential to-be-measured BWP from the plurality of to-be-selected measurement results based on a configuration on the network side or protocol stipulation, to perform measurement. If the preferential to-be-measured BWP and/or the corresponding reference signal does not exist, another measurement result may be selected for measurement.

That is, the step of determining the to-be-measured second pre-defined BWP and the reference signal of the to-be-measured second pre-defined BWP may include:

Step 2001: Based on a first preset priority, determine a preferential to-be-measured second pre-defined BWP and a reference signal of the preferential to-be-measured second pre-defined BWP from the plurality of to-be-selected measurement results.

Step 2002: When the preferential to-be-measured second pre-defined BWP and/or the corresponding reference signal does not exist, select another measurement result from the to-be-selected measurement results, and determine the to-be-measured second pre-defined BWP and the reference signal of the to-be-measured second pre-defined BWP.

Specifically, when the preferential to-be-measured second pre-defined BWP and/or the corresponding reference signal does not exist, and another measurement result is selected from the to-be-selected measurement results, any one of other measurement results of the to-be-selected measurement results may be selected, or a second pre-defined BWP with a lower priority and a reference signal of the second pre-defined BWP with a lower priority may be determined based on a configuration on the network side or protocol stipulation, to perform measurement.

For example, when there is a to-be-selected measurement result (19), (19) is selected; otherwise, any one of (1) to (19) is selected.

In this embodiment of the present disclosure, because there are a plurality of to-be-selected measurement results, the terminal may determine a measurement result of a reference signal of a preferential to-be-reported BWP from the plurality of to-be-selected measurement results based on a configuration on the network side or protocol stipulation, to perform reporting. If the measurement result of the reference signal of the preferential to-be-reported BWP does not exist, another measurement result may be selected for reporting.

That is, the step of determining the to-be-reported first pre-defined BWP and the measurement result of the reference signal of the to-be-reported first pre-defined BWP includes:

Step 2003: Based on a second preset priority, determine the measurement result of the reference signal of the preferential to-be-reported first pre-defined BWP from the plurality of to-be-selected measurement results.

Step 2004: When the measurement result of the reference signal of the preferential to-be-reported first pre-defined BWP does not exist, select another measurement result from the to-be-selected measurement results, and determine the measurement result of the reference signal of the to-be-reported first pre-defined BWP.

Specifically, when the measurement result of the reference signal of the preferential to-be-reported first pre-defined BWP does not exist, and another measurement result is selected from the to-be-selected measurement results, any one of other measurement results of the to-be-selected measurement results may be selected, or a measurement result of a reference signal of a first pre-defined BWP with a lower priority may be determined based on a configuration on the network side or protocol stipulation, to perform reporting.

For example, when there is a to-be-selected measurement result (19), (19) is selected; otherwise, any one of (1) to (19) is selected.

Figure 3:
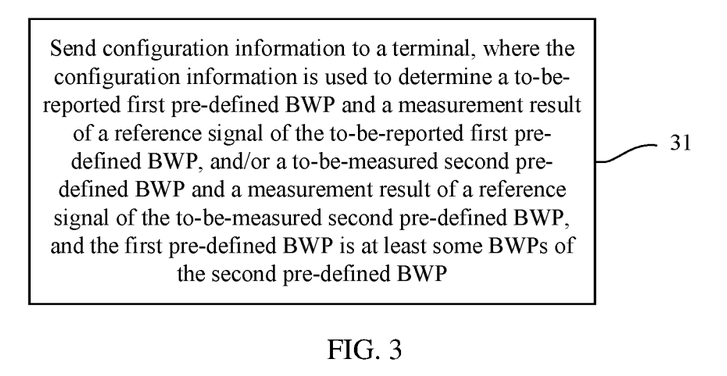
FIG. 3 is a schematic flowchart of a measurement configuration method according to an embodiment of the present disclosure.

Referring to FIG. 3, an embodiment of the present disclosure further provides a measurement configuration method, applied to a network side device, and including:

Step 31: Send configuration information to a terminal, where the configuration information is used to determine a to-be-reported first pre-defined BWP and a measurement result of a reference signal of the to-be-reported first pre-defined BWP, and/or a to-be-measured second pre-defined BWP and a measurement result of a reference signal of the to-be-measured second pre-defined BWP, and the first pre-defined BWP is at least one BWP of the second pre-defined BWP.

In this embodiment of the present disclosure, when one or more BWPs are configured for the terminal on the network side, measurement information and/or measurement reporting information of the BWPs is configured on the network side for the terminal, and a manner of measurement and/or measurement reporting is defined for the terminal, thereby improving system performance.

In this embodiment of the present disclosure, the reference signal includes at least one of the following: a CSI-RS, a DMRS, and an SSB.

In this embodiment of the present disclosure, the configuration information may be measurement configuration information or measurement reporting configuration information.

In this embodiment of the present disclosure, the configuration information is configuration information of a serving cell and/or configuration information of a neighboring cell.

In this embodiment of the present disclosure, the measurement result of the reference signal of the second pre-defined BWP, and/or the measurement result of the reference signal of the first pre-defined BWP includes at least one of the following plurality of to-be-selected measurement results:

(1) a measurement result of a reference signal of any currently activated BWP.

(2) measurement results of reference signals of all currently activated BWPs.

(3) a result obtained after combining measurement results of reference signals of all currently activated BWPs.

(4) a measurement result of a reference signal of any BWP including a CD-SSB.

(5) a measurement result of a reference signal of an activated BWP including a CD-SSB.

(6) measurement results of reference signals of all BWPs including a CD-SSB.

(7) a result obtained after combining measurement results of reference signals of all BWPs including a CD-SSB.

(8) a measurement result of a reference signal of an activated third BWP, where the third BWP is a BWP including an SSB indicated as a reference signal of a serving cell.

In this embodiment of the present disclosure, configuration information of the reference signal may include a parameter "a serving cell or not". When "a serving cell or not" indicates "yes", it indicates that the reference signal is a reference signal of a serving cell.

(9) a measurement result of a reference signal of any third BWP.

(10) measurement results of reference signals of all third BWPs.

(11) a result obtained after combining measurement results of reference signals of all third BWPs.

In (4) to (10), optionally, the reference signal of the BWP includes an SSB.

(12) a measurement result of a reference signal of an activated fourth BWP, where the fourth BWP is a BWP including a CSI-RS indicated as a reference signal of a serving cell.

(13) a measurement result of a reference signal of any fourth BWP.

(14) measurement results of reference signals of all fourth BWPs.

(15) a result obtained after combining measurement results of reference signals of all fourth BWPs.

In (12) to (15), optionally, the reference signal of the BWP includes a CSI-RS.

(16) measurement results of reference signals of all configured BWPs.

(17) a result obtained after combining measurement results of reference signals of all configured BWPs.

(18) a measurement result of a reference signal corresponding to a frequency that is configured on a network side and that is of a serving cell.

(19) a measurement result of a reference signal of a BWP on which a serving cell common configuration signaling message is located.

(20) a measurement result of a reference signal of a BWP meeting at least two of the following conditions, where a first condition is being activated currently, a second condition is including a CD-SSB, a third condition is including a CD-SSB and being activated currently, a fourth condition is including an SSB indicated as a reference signal of a serving cell and being activated currently, a fifth condition is including an SSB indicated as a reference signal of a serving cell, a sixth condition is including a CSI-RS indicated as a reference signal of a serving cell, a seventh condition is including a CSI-RS indicated as a reference signal of a serving cell and being activated currently, and an eighth condition is being used to transmit a serving cell common configuration signaling message.

In this embodiment of the present disclosure, the result obtained after combining the measurement results is: a linear average of all the measurement results, or a weighted average of all the measurement results.

Figure 4:
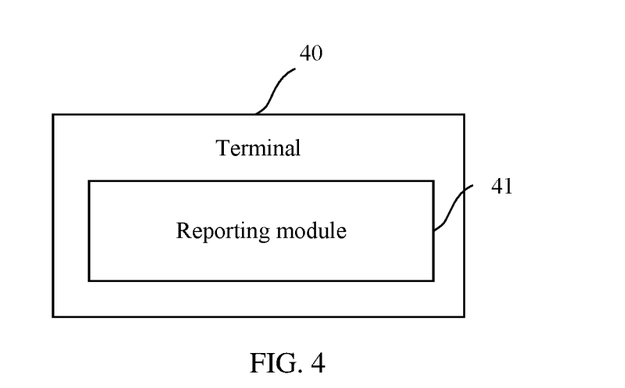
FIG. 4 is a schematic structural diagram of a terminal according to an embodiment of the present disclosure.

Based on the same invention idea, referring to FIG. 4, an embodiment of the present disclosure further provides a terminal 40, including:

a reporting module 41, configured to report a measurement result of a reference signal of a first pre-defined BWP.

In this embodiment of the present disclosure, when one or more BWPs are configured for the terminal on a network side, the terminal reports a measurement result of a reference signal of a BWP of the one or more BWPs, and a manner of measurement reporting is defined for the terminal, thereby improving system performance.

In this embodiment of the present disclosure, the reference signal may include at least one of the following: a CSI-RS, a DMRS, and an SSB.

Figure 5:
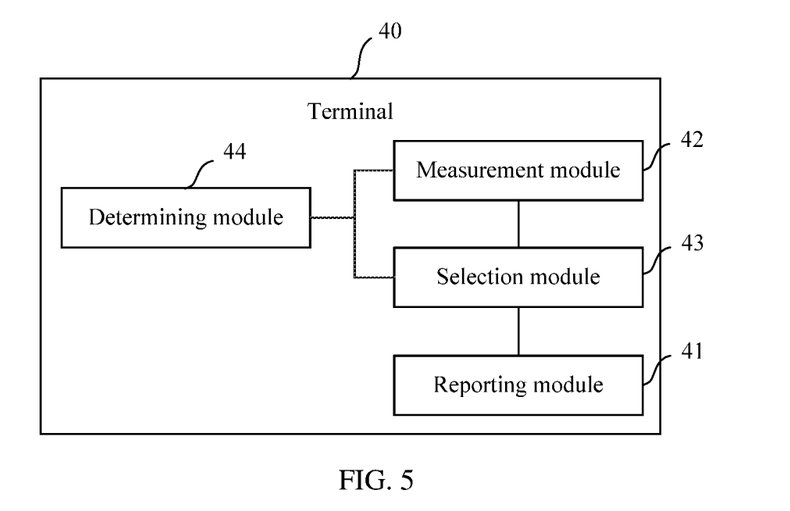
FIG. 5 is a schematic structural diagram of a terminal according to another embodiment of the present disclosure.

Referring to FIG. 5, in another embodiment of the present disclosure, the terminal 40 may further include:

a measurement module 42, configured to measure a reference signal of a second pre-defined BWP, to obtain a measurement result; and a selection module 43, configured to select at least one BWP from the second pre-defined BWP as the first pre-defined BWP.

In this embodiment of the present disclosure, the terminal 40 may further include:

a determining module 44, configured to: determine the to-be-measured second pre-defined BWP and the reference signal of the to-be-measured second pre-defined BWP based on configuration information sent by a network side device, or based on protocol stipulation; and/or determine the to-be-reported first pre-defined BWP and the measurement result of the reference signal of the to-be-reported first pre-defined BWP based on configuration information sent by a network side device, or based on protocol stipulation.

In this embodiment of the present disclosure, the configuration information is measurement configuration information or measurement reporting configuration information.

In this embodiment of the present disclosure, the configuration information is configuration information of a serving cell and/or configuration information of a neighboring cell.

In this embodiment of the present disclosure, the measurement result of the reference signal of the second pre-defined BWP, and/or the measurement result of the reference signal of the first pre-defined BWP includes at least one of the following plurality of to-be-selected measurement results:

(1) a measurement result of a reference signal of any currently activated BWP.

(2) measurement results of reference signals of all currently activated BWPs.

(3) a result obtained after combining measurement results of reference signals of all currently activated BWPs.

(4) a measurement result of a reference signal of any BWP including a CD-SSB.

(5) a measurement result of a reference signal of an activated BWP including a CD-SSB.

(6) measurement results of reference signals of all BWPs including a CD-SSB.

(7) a result obtained after combining measurement results of reference signals of all BWPs including a CD-SSB.

(8) a measurement result of a reference signal of an activated third BWP, where the third BWP is a BWP including an SSB indicated as a reference signal of a serving cell.

In this embodiment of the present disclosure, configuration information of the reference signal may include a parameter "a serving cell or not". When "a serving cell or not" indicates "yes", it indicates that the reference signal is a reference signal of a serving cell.

(9) a measurement result of a reference signal of any third BWP.

(10) measurement results of reference signals of all third BWPs.

(11) a result obtained after combining measurement results of reference signals of all third BWPs.

In (4) to (10), optionally, the reference signal of the BWP includes an SSB.

(12) a measurement result of a reference signal of an activated fourth BWP, where the fourth BWP is a BWP including a CSI-RS indicated as a reference signal of a serving cell.

(13) a measurement result of a reference signal of any fourth BWP.

(14) measurement results of reference signals of all fourth BWPs.

(15) a result obtained after combining measurement results of reference signals of all fourth BWPs.

In (12) to (15), optionally, the reference signal of the BWP includes a CSI-RS.

(16) measurement results of reference signals of all configured BWPs.

(17) a result obtained after combining measurement results of reference signals of all configured BWPs.

(18) a measurement result of a reference signal corresponding to a frequency that is configured on a network side and that is of a serving cell.

(19) a measurement result of a reference signal of a BWP on which a serving cell common configuration signaling message is located.

(20) a measurement result of a reference signal of a BWP meeting at least two of the following conditions, where a first condition is being activated currently, a second condition is including a CD-SSB, a third condition is including a CD-SSB and being activated currently, a fourth condition is including an SSB indicated as a reference signal of a serving cell and being activated currently, a fifth condition is including an SSB indicated as a reference signal of a serving cell, a sixth condition is including a CSI-RS indicated as a reference signal of a serving cell, a seventh condition is including a CSI-RS indicated as a reference signal of a serving cell and being activated currently, and an eighth condition is being used to transmit a serving cell common configuration signaling message.

In this embodiment of the present disclosure, the result obtained after combining the measurement results is: a linear average of all the measurement results, or a weighted average of all the measurement results.

In this embodiment of the present disclosure, the determining module 44 is further configured to: based on a first preset priority, determine a preferential to-be-measured second pre-defined BWP and a reference signal of the preferential to-be-measured second pre-defined BWP from the plurality of to-be-selected measurement results; and when the preferential to-be-measured second pre-defined BWP and/or the corresponding reference signal does not exist, select another measurement result from the to-be-selected measurement results, and determine the to-be-measured second pre-defined BWP and the reference signal of the to-be-measured second pre-defined BWP.

In this embodiment of the present disclosure, the determining module 44 is further configured to: based on a second preset priority, determine a measurement result of a reference signal of a preferential to-be-reported first pre-defined BWP from the plurality of to-be-selected measurement results; and when the measurement result of the reference signal of the preferential to-be-reported first pre-defined BWP does not exist, select another measurement result from the to-be-selected measurement results, and determine the measurement result of the reference signal of the to-be-reported first pre-defined BWP.

Figure 6:
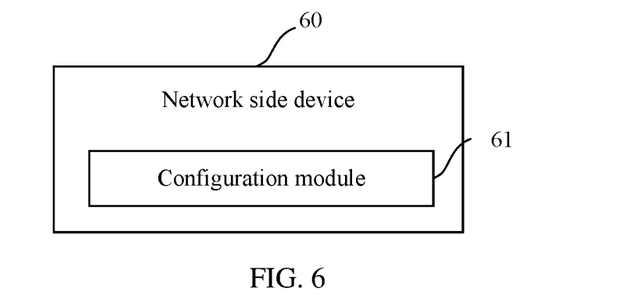
FIG. 6 is a schematic structural diagram of a network side device according to an embodiment of the present disclosure.

Referring to FIG. 6, an embodiment of the present disclosure further provides a network side device 60, including:

a configuration module 61, configured to send configuration information to a terminal, where the configuration information is used to determine a to-be-reported first pre-defined BWP and a measurement result of a reference signal of the to-be-reported first pre-defined BWP, and/or a to-be-measured second pre-defined BWP and a measurement result of a reference signal of the to-be-measured second pre-defined BWP, and the first pre-defined BWP is at least one BWP of the second pre-defined BWP.

In this embodiment of the present disclosure, when one or more BWPs are configured for the terminal on a network side, measurement information and/or measurement reporting information of the BWPs is configured on the network side for the terminal, and a manner of measurement and/or measurement reporting is defined for the terminal, thereby improving system performance.

In this embodiment of the present disclosure, the reference signal includes at least one of the following: a CSI-RS, a DMRS, and an SSB.

In this embodiment of the present disclosure, the configuration information may be measurement configuration information or measurement reporting configuration information.

In this embodiment of the present disclosure, the configuration information is configuration information of a serving cell and/or configuration information of a neighboring cell.

In this embodiment of the present disclosure, the measurement result of the reference signal of the second pre-defined BWP, and/or the measurement result of the reference signal of the first pre-defined BWP includes at least one of the following plurality of to-be-selected measurement results:

(1) a measurement result of a reference signal of any currently activated BWP.

(2) measurement results of reference signals of all currently activated BWPs.

(3) a result obtained after combining measurement results of reference signals of all currently activated BWPs.

(4) a measurement result of a reference signal of any BWP including a CD-SSB.

(5) a measurement result of a reference signal of an activated BWP including a CD-SSB.

(6) measurement results of reference signals of all BWPs including a CD-SSB.

(7) a result obtained after combining measurement results of reference signals of all BWPs including a CD-SSB.

(8) a measurement result of a reference signal of an activated third BWP, where the third BWP is a BWP including an SSB indicated as a reference signal of a serving cell.

In this embodiment of the present disclosure, configuration information of the reference signal may include a parameter "a serving cell or not". When "a serving cell or not" indicates "yes", it indicates that the reference signal is a reference signal of a serving cell.

(9) a measurement result of a reference signal of any third BWP.

(10) measurement results of reference signals of all third BWPs.

(11) a result obtained after combining measurement results of reference signals of all third BWPs.

In (4) to (10), optionally, the reference signal of the BWP includes an SSB.

(12) a measurement result of a reference signal of an activated fourth BWP, where the fourth BWP is a BWP including a CSI-RS indicated as a reference signal of a serving cell.

(13) a measurement result of a reference signal of any fourth BWP.

(14) measurement results of reference signals of all fourth BWPs.

(15) a result obtained after combining measurement results of reference signals of all fourth BWPs.

In (12) to (15), optionally, the reference signal of the BWP includes a CSI-RS.

(16) measurement results of reference signals of all configured BWPs.

(17) a result obtained after combining measurement results of reference signals of all configured BWPs.

(18) a measurement result of a reference signal corresponding to a frequency that is configured on a network side and that is of a serving cell.

(19) a measurement result of a reference signal of a BWP on which a serving cell common configuration signaling message is located.

(20) a measurement result of a reference signal of a BWP meeting at least two of the following conditions, where a first condition is being activated currently, a second condition is including a CD-SSB, a third condition is including a CD-SSB and being activated currently, a fourth condition is including an SSB indicated as a reference signal of a serving cell and being activated currently, a fifth condition is including an SSB indicated as a reference signal of a serving cell, a sixth condition is including a CSI-RS indicated as a reference signal of a serving cell, a seventh condition is including a CSI-RS indicated as a reference signal of a serving cell and being activated currently, and an eighth condition is being used to transmit a serving cell common configuration signaling message.

In this embodiment of the present disclosure, the result obtained after combining the measurement results is: a linear average of all the measurement results, or a weighted average of all the measurement results.

Figure 7:
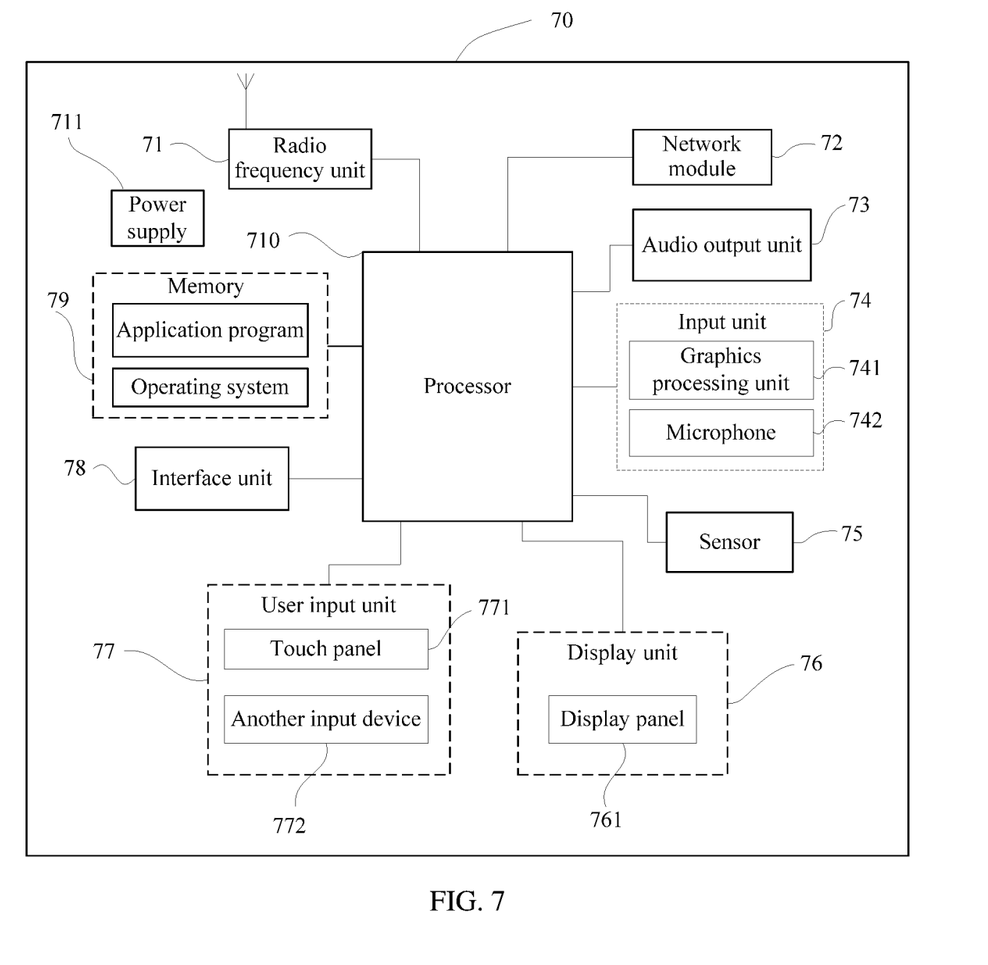
FIG. 7 is a schematic structural diagram of a terminal according to still another embodiment of the present disclosure.

Referring to FIG. 7, FIG. 7 is a schematic structural diagram of a terminal according to still another embodiment of the present disclosure. The terminal 70 includes, but is not limited to: components such as a radio frequency unit 71, a network module 72, an audio output unit 73, an input unit 74, a sensor 75, a display unit 76, a user input unit 77, an interface unit 78, a memory 79, a processor 710, and a power supply 711. A person skilled in the art can understand that the structure of the terminal shown in FIG. 7 constitutes no limitation on the terminal, and the terminal may include more or fewer components than those shown in the figure, or combine some components, or have different component arrangements. In this embodiment of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 71 is configured to report a measurement result of a reference signal of a first predefined BWP.

In this embodiment of the present disclosure, when one or more BWPs are configured for the terminal on a network side, the terminal reports a measurement result of a reference signal of a BWP of the one or more BWPs, and a manner of measurement reporting is defined for the terminal, thereby improving system performance.

It should be understood that in this embodiment of the present disclosure, the radio frequency unit 71 may be configured to receive and send signals in a process of receiving and sending information or calling. Specifically, the radio frequency unit 71 receives downlink data from a base station for processing by the processor 710, and sends uplink data to the base station. Generally, the radio frequency unit 71 includes, but is not limited to, an antenna, at least one amplifier, a transceiver, a coupler, a low noise amplifier, a duplexer, and the like. In addition, the radio frequency unit 71 may further communicate with a network and another device through a wireless communications system.

The terminal provides wireless broadband Internet access to a user through the network module 72, for example, helps the user receive and send emails, browse web pages, and access streaming media.

The audio output unit 73 may convert audio data received by the radio frequency unit 71 or the network module 72 or stored in the memory 79 into an audio signal, and output the audio signal as sound. Moreover, the audio output unit 73 may further provide an audio output (for example, call signal receiving sound and message receiving sound) related to a specific function performed by the terminal 70. The audio output unit 73 includes a speaker, a buzzer, a receiver, and the like.

The input unit 74 is configured to receive an audio signal or a video signal. The input unit 74 may include a graphics processing unit (Graphics Processing Unit, GPU) 741 and a microphone 742. The graphics processing unit 741 processes image data of a static image or a video obtained by an image capturing apparatus (for example, a camera) in a video capturing mode or an image capturing mode. A processed image frame may be displayed on the display unit 76. The image frame processed by the graphics processing unit 741 can be stored in the memory 79 (or another storage medium) or sent by the radio frequency unit 71 or the network module 72. The microphone 742 can receive sound, and can process such sound into audio data. The processed audio data may be converted, in a telephone call mode, into a format output that may be sent to a mobile communications base station through the radio frequency unit 71.

The terminal 70 further includes at least one sensor 75, such as a light sensor, a motion sensor, and other sensors. Specifically, the light sensor includes an ambient light sensor and a proximity sensor, where the ambient light sensor can adjust brightness of the display panel 761 based on brightness of an ambient light ray, and the proximity sensor can turn off the display panel 761 and/or backlight when the terminal 70 moves near the ear. As a type of motion sensor, an accelerometer sensor can detect accelerations in all directions (generally, three axes), and can detect the magnitude and direction of gravity when it is still. The accelerometer sensor may be configured to: identify a terminal posture (for example, switching between a landscape mode and a portrait mode, related games, and magnetometer posture calibration), perform a vibration identification-related function (for example, a pedometer and a knock), and the like. The sensor 75 may further include a fingerprint sensor, a pressure sensor, an iris sensor, a molecular sensor, a gyroscope, a barometer, a hygrometer, a thermometer, an infrared sensor, and the like. Details are not described herein again.

The display unit 76 is configured to display information input by a user or information provided to a user. The display unit 76 may include the display panel 761, and the display panel 761 may be configured in a form of liquid crystal display (Liquid Crystal Display, LCD), organic light-emitting diode (Organic Light-Emitting Diode, OLED), or the like.

The user input unit 77 may be configured to receive inputted digit or character information and generate a key signal input related to user setting and function control of the terminal. Specifically, the user input unit 77 includes a touch panel 771 and another input device 772. The touch panel 771 is also referred to as a touchscreen, and can collect a touch operation on or near the touch panel 771 by a user (for example, an operation on or near the touch panel 771 by the user with any suitable object or accessory such as a finger or a stylus). The touch panel 771 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 710, and receives and executes a command sent by the processor 710. In addition, the touch panel 771 can be implemented by using various types such as a resistive type, a capacitive type, an infrared type, or a surface acoustic wave type. In addition to the touch panel 771, the user input unit 77 may also include the another input device 772. Specifically, the another input device 772 may include, but is not limited to, a physical keyboard, functional keys (for example, a volume control key and a switch key), a trackball, a mouse, and a joystick. Details are not described herein again.

Further, the touch panel 771 may cover the display panel 761. When the touch panel 771 detects a touch operation on or near the touch panel 771, the touch operation is transmitted to the processor 710 to determine a type of a touch event, and then the processor 710 provides a corresponding visual output on the display panel 761 based on the type of the touch event. Although the touch panel 771 and the display panel 761 are two independent components for implementing input and output functions of the terminal in FIG. 7, in some embodiments, the touch panel 771 and the display panel 761 may be integrated to implement the input and output functions of the terminal. Details are not limited herein.

The interface unit 78 is an interface connecting an external apparatus to the terminal 70. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 78 may be configured to receive an input (for example, data information and power) from an external apparatus and transmit the received input to one or more elements in the terminal 70, or may be configured to transmit data between the terminal 70 and the external apparatus.

The memory 79 may be configured to store a software program and various data. The memory 79 may mainly include a program storage area and a data storage area. The program storage area may store an operating system, an application program required by at least one function (for example, a sound playing function and an image display function), and the like. The data storage area may store data created based on use of a mobile phone (for example, audio data and a phonebook), and the like. In addition, the memory 79 may include a high-speed random access memory, and may also include a non-volatile memory, such as at least one magnetic disk storage device, a flash memory device, or other volatile solid-state memory devices.

The processor 710 is a control center of the terminal. The processor 710 uses various interfaces and lines to connect various parts of the entire terminal, and performs various functions of the terminal and processes data by running or executing a software program and/or a module stored in the memory 79 and invoking data stored in the memory 79, to monitor the terminal as a whole. The processor 710 may include one or more processing units. Optionally, the processor 710 may integrate an application processor and a modem processor. The application processor mainly deals with an operating system, a user interface, an application program, and the like. The modem processor mainly deals with wireless communication. It can be understood that alternatively, the foregoing modem processor may not be integrated into the processor 710.

The terminal 70 may further include a power supply 711 (for example, a battery) that supplies power to various components. Optionally, the power supply 711 may be logically connected to the processor 710 through a power supply management system, to perform functions of managing charging, discharging, and power consumption through the power supply management system.

In addition, the terminal 70 includes some functional modules not shown. Details are not described herein again.

Figure 8:
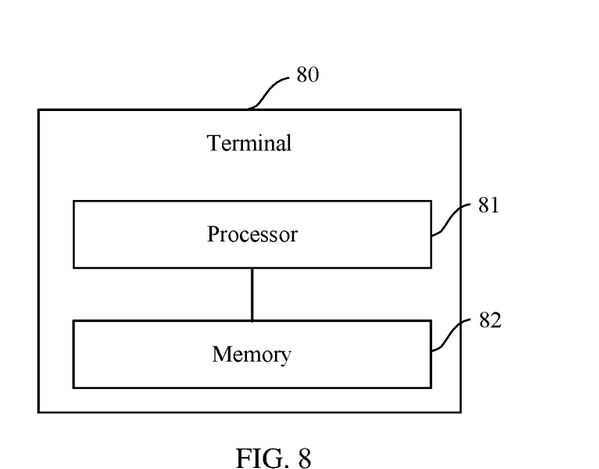
FIG. 8 is a schematic structural diagram of a terminal according to yet another embodiment of the present disclosure.

Referring to FIG. 8, FIG. 8 is a schematic structural diagram of a terminal according to yet another embodiment of the present disclosure. The terminal 80 includes: a processor 81 and a memory 82. In this embodiment of the present disclosure, the terminal 80 further includes: a computer program stored in the memory 82 and executable on the processor 81. When the computer program is executed by the processor 81, the following step is performed: reporting a measurement result of a reference signal of a first pre-defined BWP.

The processor 81 is responsible for management of a bus architecture and general processing. The memory 82 can store data used by the processor 81 during operation execution.

Optionally, when the computer program is executed by the processor 81, the following steps may be further performed: measuring a reference signal of a second pre-defined BWP, to obtain a measurement result; and selecting at least one BWP from the second pre-defined BWP as the first pre-defined BWP.

Optionally, when the computer program is executed by the processor 81, the following steps may be further performed: determining the to-be-measured second pre-defined BWP and the reference signal of the to-be-measured second pre-defined BWP based on configuration information sent by a network side device, or based on protocol stipulation; and/or determining the to-be-reported first pre-defined BWP and the measurement result of the reference signal of the to-be-reported first pre-defined BWP based on configuration information sent by a network side device, or based on protocol stipulation.

Optionally, the configuration information is measurement configuration information or measurement reporting configuration information.

Optionally, the configuration information is configuration information of a serving cell and/or configuration information of a neighboring cell.

Optionally, the measurement result of the reference signal of the second pre-defined BWP, and/or the measurement result of the reference signal of the first pre-defined BWP includes at least one of the following plurality of to-be-selected measurement results:

a measurement result of a reference signal of any currently activated BWP;

measurement results of reference signals of all currently activated BWPs;

a result obtained after combining measurement results of reference signals of all currently activated BWPs;

a measurement result of a reference signal of any BWP including a CD-SSB;

a measurement result of a reference signal of an activated BWP including a CD-SSB;

measurement results of reference signals of all BWPs including a CD-SSB;

a result obtained after combining measurement results of reference signals of all BWPs including a CD-SSB;

a measurement result of a reference signal of an activated third BWP, where the third BWP is a BWP including an SSB indicated as a reference signal of a serving cell;

a measurement result of a reference signal of any third BWP;

measurement results of reference signals of all third BWPs;

a result obtained after combining measurement results of reference signals of all third BWPs;

a measurement result of a reference signal of an activated fourth BWP, where the fourth BWP is a BWP including a CSI-RS indicated as a reference signal of a serving cell;

a measurement result of a reference signal of any fourth BWP;

measurement results of reference signals of all fourth BWPs;

a result obtained after combining measurement results of reference signals of all fourth BWPs;

measurement results of reference signals of all configured BWPs;

a result obtained after combining measurement results of reference signals of all configured BWPs;

a measurement result of a reference signal corresponding to a frequency that is configured on a network side and that is of a serving cell;

a measurement result of a reference signal of a BWP on which a serving cell common configuration signaling message is located; and a measurement result of a reference signal of a BWP meeting at least two of the following conditions, where a first condition is being activated currently, a second condition is including a CD-SSB, a third condition is including a CD-SSB and being activated currently, a fourth condition is including an SSB indicated as a reference signal of a serving cell and being activated currently, a fifth condition is including an SSB indicated as a reference signal of a serving cell, a sixth condition is including a CSI-RS indicated as a reference signal of a serving cell, a seventh condition is including a CSI-RS indicated as a reference signal of a serving cell and being activated currently, and an eighth condition is being used to transmit a serving cell common configuration signaling message.

Optionally, the result obtained after combining the measurement results is: a linear average of all the measurement results, or a weighted average of all the measurement results.

Optionally, when the computer program is executed by the processor 81, the following steps may be further performed: based on a first preset priority, determining a preferential to-be-measured second pre-defined BWP and a reference signal of the preferential to-be-measured second pre-defined BWP from the plurality of to-be-selected measurement results; and when the preferential to-be-measured second pre-defined BWP and/or the corresponding reference signal does not exist, selecting another measurement result from the to-be-selected measurement results, and determining the to-be-measured second pre-defined BWP and the reference signal of the to-be-measured second pre-defined BWP.

Optionally, when the computer program is executed by the processor 81, the following steps may be further performed: based on a second preset priority, determining a measurement result of a reference signal of a preferential to-be-reported first pre-defined BWP from the plurality of to-be-selected measurement results; and when the measurement result of the reference signal of the preferential to-be-reported first pre-defined BWP does not exist, selecting another measurement result from the to-be-selected measurement results, and determining the measurement result of the reference signal of the to-be-reported first pre-defined BWP.

Optionally, the reference signal includes at least one of the following: a CSI-RS, a DMRS, and an SSB.

Figure 9:
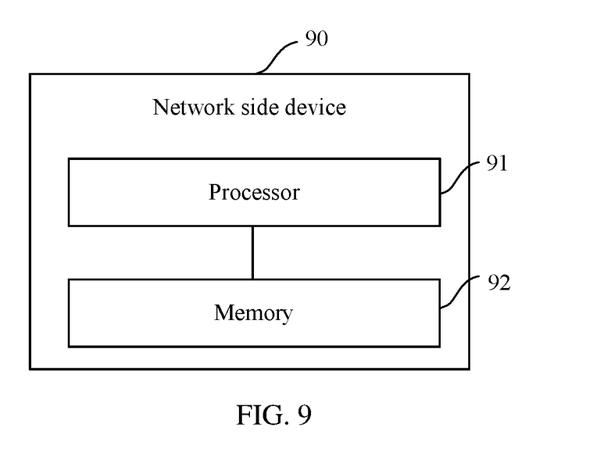
FIG. 9 is a schematic structural diagram of a network side device according to another embodiment of the present disclosure.

Referring to FIG. 9, FIG. 9 is a schematic structural diagram of a network side device according to still another embodiment of the present disclosure. The network side device 90 includes: a processor 91 and a memory 92. In this embodiment of the present disclosure, the terminal 90 further includes: a computer program stored in the memory 92 and executable on the processor 91. When the computer program is executed by the processor 91, the following step is performed: sending configuration information to a terminal, where the configuration information is used to determine a to-be-reported first pre-defined BWP and a measurement result of a reference signal of the to-be-reported first pre-defined BWP, and/or a to-be-measured second pre-defined BWP and a measurement result of a reference signal of the to-be-measured second pre-defined BWP, and the first pre-defined BWP is at least one BWP of the second pre-defined BWP.

The processor 91 is responsible for management of a bus architecture and general processing. The memory 92 can store data used by the processor 91 during operation execution.

Optionally, the configuration information is measurement configuration information or measurement reporting configuration information.

Optionally, the configuration information is configuration information of a serving cell and/or configuration information of a neighboring cell.

Optionally, the measurement result of the reference signal of the second pre-defined BWP, and/or the measurement result of the reference signal of the first pre-defined BWP includes at least one of the following plurality of to-be-selected measurement results:

a measurement result of a reference signal of any currently activated BWP;

measurement results of reference signals of all currently activated BWPs;

a result obtained after combining measurement results of reference signals of all currently activated BWPs; a measurement result of a reference signal of any BWP including a CD-SSB;

a measurement result of a reference signal of an activated BWP including a CD-SSB;

measurement results of reference signals of all BWPs including a CD-SSB;

a result obtained after combining measurement results of reference signals of all BWPs including a CD-SSB;

a measurement result of a reference signal of an activated third BWP, where the third BWP is a BWP including an SSB indicated as a reference signal of a serving cell;

a measurement result of a reference signal of any third BWP;

measurement results of reference signals of all third BWPs;

a result obtained after combining measurement results of reference signals of all third BWPs;

a measurement result of a reference signal of an activated fourth BWP, where the fourth BWP is a BWP including a CSI-RS indicated as a reference signal of a serving cell;

a measurement result of a reference signal of any fourth BWP;

measurement results of reference signals of all fourth BWPs;

a result obtained after combining measurement results of reference signals of all fourth BWPs;

measurement results of reference signals of all configured BWPs;

a result obtained after combining measurement results of reference signals of all configured BWPs;

a measurement result of a reference signal corresponding to a frequency that is configured on a network side and that is of a serving cell;

a measurement result of a reference signal of a BWP on which a serving cell common configuration signaling message is located; and a measurement result of a reference signal of a BWP meeting at least two of the following conditions, where a first condition is being activated currently, a second condition is including a CD-SSB, a third condition is including a CD-SSB and being activated currently, a fourth condition is including an SSB indicated as a reference signal of a serving cell and being activated currently, a fifth condition is including an SSB indicated as a reference signal of a serving cell, a sixth condition is including a CSI-RS indicated as a reference signal of a serving cell, a seventh condition is including a CSI-RS indicated as a reference signal of a serving cell and being activated currently, and an eighth condition is being used to transmit a serving cell common configuration signaling message.

Optionally, the result obtained after combining the measurement results is: a linear average of all the measurement results, or a weighted average of all the measurement results.

Optionally, the reference signal includes at least one of the following: a CSI-RS, a DMRS, and an SSB.

An embodiment of the present disclosure further provides a computer readable storage medium, where the computer readable storage medium stores a computer program, and when the computer program is executed by a processor, the processes of the embodiments of the foregoing measurement reporting method are implemented, and the same technical effects can be achieved. To avoid repetition, details are not described herein again.

An embodiment of the present disclosure further provides a computer readable storage medium, where the computer readable storage medium stores a computer program, and when the computer program is executed by a processor, the processes of the embodiments of the foregoing measurement configuration method are implemented, and the same technical effects can be achieved. To avoid repetition, details are not described herein again.

The computer readable storage medium is, for example, a read-only memory (Read-Only Memory, ROM for short), a random access memory (Random Access Memory, RAM for short), a magnetic disk, or an optical disc.

It should be noted that in this specification, the term "comprise", "include", or any other variant thereof is intended to cover non-exclusive inclusion, so that a process, a method, an article, or an apparatus that includes a series of elements not only includes these elements, but also includes other elements not clearly listed, or includes elements inherent to such process, method, article, or apparatus. Without being subject to further limitations, an element defined by a phrase "including a . . . " does not exclude presence of another identical element in the process, method, article, or apparatus that includes the element.

By means of the foregoing description of the implementations, a person skilled in the art may clearly understand that the methods in the foregoing embodiments may be implemented by software combined with a necessary general hardware platform. Certainly, the methods in the foregoing embodiments may also be implemented by hardware. However, in many cases, the former is a preferred implementation. Based on such an understanding, the technical solutions of the present disclosure essentially, or the part contributing to the prior art may be implemented in a form of a software product. The computer software product is stored in a storage medium (for example, a ROM/RAM, a magnetic disk, or an optical disc), and includes several instructions for enabling a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely illustrative instead of restrictive. Under enlightenment of the present disclosure, a person of ordinary skills in the art can make many forms without departing from the objectives of the present disclosure and the protection scope of claims, and these forms all fall within the protection of the present disclosure.

The invention claimed is:

1. A measurement reporting method, applied to a terminal, and comprising:
  reporting a measurement result of a reference signal of a first pre-defined bandwidth part BWP;
  wherein before the step of reporting the measurement result of the reference signal of the first pre-defined BWP, the method further comprises:
  measuring a reference signal of a second pre-defined BWP, to obtain a measurement result; and
  selecting at least one BWP from the second pre-defined BWP as the first pre-defined BWP;

wherein before the step of measuring the reference signal of the second pre-defined BWP, the method further comprises:
determining the to-be-measured second pre-defined BWP and the reference signal of the to-be-measured second pre-defined BWP, based on protocol stipulation.

2. The measurement reporting method according to claim 1, before the step of measuring a reference signal of a second pre-defined BWP, further comprising:
determining the to-be-reported first pre-defined BWP and the measurement result of the reference signal of the to-be-reported first pre-defined BWP based on configuration information sent by a network side device, or based on protocol stipulation.

3. The measurement reporting method according to claim 2, wherein the configuration information is measurement configuration information or measurement reporting configuration information.

4. The measurement reporting method according to claim 2, wherein the configuration information is configuration information of a serving cell and/or configuration information of a neighboring cell.

5. The measurement reporting method according to claim 2, wherein the measurement result of the reference signal of the second pre-defined BWP, and/or the measurement result of the reference signal of the first pre-defined BWP comprises at least one of the following plurality of to-be-selected measurement results:
a measurement result of a reference signal of any currently activated BWP;
measurement results of reference signals of all currently activated BWPs;
a result obtained after combining measurement results of reference signals of all currently activated BWPs;
a measurement result of a reference signal of any BWP comprising a cell-defined synchronization signal block CD-SSB;
a measurement result of a reference signal of an activated BWP comprising a CD-SSB;
measurement results of reference signals of all BWPs comprising a CD-SSB;
a result obtained after combining measurement results of reference signals of all BWPs comprising a CD-SSB;
a measurement result of a reference signal of an activated third BWP, wherein the third BWP is a BWP comprising an SSB indicated as a reference signal of a serving cell;
a measurement result of a reference signal of any third BWP;
measurement results of reference signals of all third BWPs;
a result obtained after combining measurement results of reference signals of all third BWPs;
a measurement result of a reference signal of an activated fourth BWP, wherein the fourth BWP is a BWP comprising a channel state information reference signal CSI-RS indicated as a reference signal of a serving cell;
a measurement result of a reference signal of any fourth BWP;
measurement results of reference signals of all fourth BWPs;
a result obtained after combining measurement results of reference signals of all fourth BWPs;
measurement results of reference signals of all configured BWPs;
a result obtained after combining measurement results of reference signals of all configured BWPs;
a measurement result of a reference signal corresponding to a frequency that is configured on a network side and that is of a serving cell;
a measurement result of a reference signal of a BWP on which a serving cell common configuration signaling message is located; and
a measurement result of a reference signal of a BWP meeting at least two of the following conditions, wherein a first condition is being activated currently, a second condition is comprising a CD-SSB, a third condition is comprising a CD-SSB and being activated currently, a fourth condition is comprising a synchronization signal block SSB indicated as a reference signal of a serving cell and being activated currently, a fifth condition is comprising an SSB indicated as a reference signal of a serving cell, a sixth condition is comprising a CSI-RS indicated as a reference signal of a serving cell, a seventh condition is comprising a CSI-RS indicated as a reference signal of a serving cell and being activated currently, and an eighth condition is being used to transmit a serving cell common configuration signaling message.

6. The measurement reporting method according to claim 5, wherein the result obtained after combining the measurement results is: a linear average of all the measurement results, or a weighted average of all the measurement results.

7. The measurement reporting method according to claim 5, wherein the step of determining the to-be-measured second pre-defined BWP and the reference signal of the to-be-measured second pre-defined BWP comprises:
based on a first preset priority, determining a preferential to-be-measured second pre-defined BWP and a reference signal of the preferential to-be-measured second pre-defined BWP from the plurality of to-be-selected measurement results.

8. The measurement reporting method according to claim 5, wherein the step of determining the to-be-reported first pre-defined BWP and the measurement result of the reference signal of the to-be-reported first pre-defined BWP comprises:
based on a second preset priority, determining a measurement result of a reference signal of a preferential to-be-reported first pre-defined BWP from the plurality of to-be-selected measurement results.

9. The measurement reporting method according to claim 1, wherein the reference signal comprises at least one of the following: a CSI-RS, a demodulation reference signal DMRS, and an SSB.

10. A measurement configuration method, applied to a network side device, and comprising:
sending configuration information to a terminal, wherein the configuration information is used to determine a to-be-reported first pre-defined bandwidth part BWP and a measurement result of a reference signal of the to-be-reported first pre-defined bandwidth part BWP, the first pre-defined BWP is at least one BWP of a to-be-measured second pre-defined BWP, and the to-be-measured second pre-defined BWP and a reference signal of the to-be-measured second pre-defined BWP are determined based on protocol stipulation.

11. The measurement configuration method according to claim 10, wherein the configuration information is measurement configuration information or measurement reporting configuration information.

12. The measurement configuration method according to claim 10, wherein the configuration information is configuration information of a serving cell and/or configuration information of a neighboring cell.

13. The measurement configuration method according to claim 10, wherein the measurement result of the reference signal of the second pre-defined BWP, and/or the measurement result of the reference signal of the first pre-defined BWP comprises at least one of the following plurality of to-be-selected measurement results:
a measurement result of a reference signal of any currently activated BWP;
measurement results of reference signals of all currently activated BWPs;
a result obtained after combining measurement results of reference signals of all currently activated BWPs; a measurement result of a reference signal of any BWP comprising a cell-defined synchronization signal block CD-SSB;
a measurement result of a reference signal of an activated BWP comprising a CD-SSB;
measurement results of reference signals of all BWPs comprising a CD-SSB;
a result obtained after combining measurement results of reference signals of all BWPs comprising a CD-SSB;
a measurement result of a reference signal of an activated third BWP, wherein the third BWP is a BWP comprising a synchronization signal block SSB indicated as a reference signal of a serving cell;
a measurement result of a reference signal of any third BWP;
measurement results of reference signals of all third BWPs;
a result obtained after combining measurement results of reference signals of all third BWPs;
a measurement result of a reference signal of an activated fourth BWP, wherein the fourth BWP is a BWP comprising a channel state information reference signal CSI-RS indicated as a reference signal of a serving cell;
a measurement result of a reference signal of any fourth BWP;
measurement results of reference signals of all fourth BWPs;
a result obtained after combining measurement results of reference signals of all fourth BWPs;
measurement results of reference signals of all configured BWPs;
a result obtained after combining measurement results of reference signals of all configured BWPs;
a measurement result of a reference signal corresponding to a frequency that is configured on a network side and that is of a serving cell;
a measurement result of a reference signal of a BWP on which a serving cell common configuration signaling message is located; and
a measurement result of a reference signal of a BWP meeting at least two of the following conditions, wherein a first condition is being activated currently, a second condition is comprising a CD-SSB, a third condition is comprising a CD-SSB and being activated currently, a fourth condition is comprising an SSB indicated as a reference signal of a serving cell and being activated currently, a fifth condition is comprising an SSB indicated as a reference signal of a serving cell, a sixth condition is comprising a CSI-RS indicated as a reference signal of a serving cell, a seventh condition is comprising a CSI-RS indicated as a reference signal of a serving cell and being activated currently, and an eighth condition is being used to transmit a serving cell common configuration signaling message.

14. The measurement configuration method according to claim 13, wherein the result obtained after combining the measurement results is: a linear average of all the measurement results, or a weighted average of all the measurement results.

15. The measurement configuration method according to claim 10, wherein the reference signal comprises at least one of the following: a CSI-RS, a demodulation reference signal DMRS, and an SSB.

16. A terminal, comprising: a processor, a memory, and a program stored in the memory and executable on the processor, wherein the processor executes the program to:
report a measurement result of a reference signal of a first pre-defined bandwidth part BWP;
wherein before reporting the measurement result of the reference signal of the first pre-defined BWP, the processor executes the program to:
measure a reference signal of a second pre-defined BWP, to obtain a measurement result; and
select at least one BWP from the second pre-defined BWP as the first pre-defined BWP;
wherein before measuring the reference signal of the second pre-defined BWP, the processor executes the program to:
determine the to-be-measured second pre-defined BWP and the reference signal of the to-be-measured second pre-defined BWP, based on protocol stipulation.

17. The terminal according to claim 16, wherein the processor executes the program to:
determine the to-be-reported first pre-defined BWP and the measurement result of the reference signal of the to-be-reported first pre-defined BWP based on configuration information sent by a network side device, or based on protocol stipulation.

18. A network side device, comprising a processor, a memory, and a program stored in the memory and executable on the processor, wherein when the program is executed by the processor, the steps of the measurement configuration method according to claim 10 are performed.

* * * * *